(12) United States Patent
Kalenborn

(10) Patent No.: US 10,480,467 B2
(45) Date of Patent: Nov. 19, 2019

(54) FLOW LIMITING VALVE, IN PARTICULAR FOR A DUAL FUEL INJECTION SYSTEM

(71) Applicant: L'Orange GmbH, Stuttgart (DE)

(72) Inventor: Markus Kalenborn, Dornstadt (DE)

(73) Assignee: L'Orange GMBH, Stuttgart (DE)

( * ) Notice: Subject to any disclaimer, the term of this patent is extended or adjusted under 35 U.S.C. 154(b) by 267 days.

(21) Appl. No.: 15/292,827

(22) Filed: Oct. 13, 2016

(65) Prior Publication Data

US 2017/0030311 A1 Feb. 2, 2017

Related U.S. Application Data

(63) Continuation of application No. PCT/EP2015/000638, filed on Mar. 25, 2015.

(30) Foreign Application Priority Data

Apr. 16, 2014 (DE) .................. 10 2014 105 439

(51) Int. Cl.
*F02M 43/04* (2006.01)
*F02M 21/02* (2006.01)
*F02D 19/06* (2006.01)

(52) U.S. Cl.
CPC ......... *F02M 43/04* (2013.01); *F02D 19/0681* (2013.01); *F02M 21/0239* (2013.01); *Y02T 10/36* (2013.01)

(58) Field of Classification Search
CPC .... F02M 43/04; F02M 43/00; F02D 19/0681; F02D 19/0684
See application file for complete search history.

(56) References Cited

U.S. PATENT DOCUMENTS

| 4,606,322 A * | 8/1986 | Reid ................... F02D 19/0684 123/458 |
| 6,209,523 B1 | 4/2001 | Lehtonen |
| 9,422,899 B2 | 8/2016 | Kim et al. |
| 2014/0123936 A1* | 5/2014 | Kim ...................... F02M 43/04 123/299 |

FOREIGN PATENT DOCUMENTS

| CN | 101415931 | 4/2009 |
| CN | 103119346 | 5/2013 |
| DE | 195 48 610 A1 | 6/1997 |

(Continued)

OTHER PUBLICATIONS

International Search Report dated Jul. 21, 2015 for International Application No. PCT/EP2015/000638 (4 pages).

(Continued)

*Primary Examiner* — Kevin A Lathers
(74) *Attorney, Agent, or Firm* — Fish & Richardson P.C.

(57) ABSTRACT

A flow limiting valve, comprising a valve body adjustable between a closed position and an open position, wherein in the open position a flow channel for a conveying fluid is opened in the flow limiting valve and in the closed position the flow channel is closed, whereby the adjustment of the valve body is subject to conveying fluid pressure; wherein a control valve is integrated into a housing of the flow limiting valve through which the valve body is adjustable between open and closed positions, regardless of the conveying fluid.

15 Claims, 2 Drawing Sheets

(56) References Cited

FOREIGN PATENT DOCUMENTS

| DE | 102005036780 A1 * | 2/2007 |
|---|---|---|
| DE | 10 2008 014 250 A1 | 9/2009 |
| EP | 2 423 498 A1 | 2/2012 |
| WO | WO8900640 | 1/1989 |
| WO | 2007/014733 A1 | 2/2007 |
| WO | 2015/058822 A1 | 4/2015 |
| WO | 2015/090494 A1 | 6/2015 |
| WO | 2015/101406 A1 | 7/2015 |

OTHER PUBLICATIONS

Chinese Second Office Action in Chinese Application No. 201580019948.4, dated Mar. 26 2019, 15 pages, with English Translation.
Chinese First Office Action in Chinese Application No. 201580019948.4, dated May 4, 2018, 15 pages, with English Translation.

* cited by examiner

FLOW LIMITING VALVE, IN PARTICULAR FOR A DUAL FUEL INJECTION SYSTEM

CROSS REFERENCE TO RELATED APPLICATIONS

This is a continuation of PCT application No. PCT/EP2015/000638, entitled "FLOW LIMITING VALVE, IN PARTICULAR FOR A DUAL FUEL INJECTION SYSTEM", filed Mar. 25, 2015, which is incorporated herein by reference.

BACKGROUND OF THE INVENTION

1. Field of the Invention

The invention relates to a flow limiting valve, in particular to a dual fuel injection system.

2. Description of the Related Art

In EP 2 423 498 A1 a flow limiting valve for a large diesel engine is described that includes an axially adjustable valve body in a valve chamber that is pre-tensioned by a spring element against a valve seat on the inlet side. The pressure on the outlet side at the flow limiting valve reduces at the beginning of a fuel injection process, as a result of which the valve body is lifted off the valve seat and fuel can pass through the flow limiting valve. As soon as the injection process is ended, the pressure on the outlet side is again built up, causing the valve body to again move into the closed position.

What is needed in the art a compact flow limiting valve that offers variable adjustment possibilities by applying simple constructive measures.

SUMMARY OF THE INVENTION

The flow limiting valve according to the present invention is used to control the flow of a conveying fluid that is directed through the flow limiting valve. The conveying fluid is for example a gaseous medium, whereby in principle also liquid media are considered. It is in particular possible to use the flow limiting valve for a fuel injection system in an internal combustion engine, preferably for a dual-fuel injection system wherein the internal combustion engine can be driven with burnable gas in particular in the pilot injection method, as well as with liquid fuel, in particular with diesel fuel, bio fuel or heavy fuel oil. In a dual fuel injection system of this type, the flow limiting valve is allocated preferably to a burnable gas injector. It is however also possible to additionally or alternatively allocate the flow limiting valve to a liquid fuel injector.

The flow limiting valve includes a valve body that is adjustable between a closed and an open position, wherein in the open position a flow channel for the conveying fluid is opened and in the closed position is closed. The adjustment movement of the valve body is controlled by the pressure of the conveying fluid.

In addition, a control valve is integrated into the housing of the flow limiting valve, in order to be able to adjust the valve body between open and closed position, regardless of the pressure of the conveying fluid. This allows for closure of the flow limiting valve also in situations—and thereby interrupting the through-flow of the conveying fluid—wherein the conveying fluid assumes a value at which the valve body remains in the open position. The control valve actuates the valve body that is in the open position and moves the same into the closed position. The control valve thus permits closure of the flow limiting valve in additional situations, regardless of the pressure of the conveying fluid. It is in particular possible to close the flow limiting valve via the control valve if the valve body is in the open position due to the actual pressure of the conveying fluid.

The control valve is integrated into the housing of the flow limiting valve, so that no additional space requirement arises for the control valve; and overall, a compact flow limiting valve can be provided. The flow limiting valve can possibly be integrated into the injector unit.

According to one advantageous embodiment, the control valve is designed as a passive unit without its own energy supply, so that no electric, pneumatic or hydraulic actuator is necessary in the control valve for implementation of the adjusting motion. According to an alternative embodiment it can, however, also be useful to design the control valve as an active unit and to equip it with an electric, pneumatic or hydraulic actuator, for example an electromagnetic control element that, when operated, moves the valve body. The actuator of the control valve that is designed as an active unit is preferably controlled via control signals that originate from a sensor in the fuel injection system, for example a pressure sensor.

According to one embodiment, a control element of the control valve that forms the valve element of the control valve and that actuates the valve body of the flow limiting valve is adjusted via a control fluid. In particular, when using the flow limiting valve in a fuel injection system, a liquid fuel that is under pressure in the fuel injection system can be used as the control fluid and fed to an injector unit. It is for example possible to divert part of the liquid fuel that is under pressure via a control line and to supply it to the control valve for activation of the control element. This embodiment offers the advantage that the control element is of a passive design and an active activation of the control element through its own energy supply is not necessary. Rather, activation occurs via the liquid fuel, whereby pressure changes in the supplied liquid fuel lead to an adjusting motion of the control element of the control valve.

According to another embodiment, the flow limiting valve is utilized in a dual fuel injection system that includes a burnable gas injector unit and a liquid fuel injector unit. The flow limiting valve is preferably allocated to the burnable gas injection unit. In principle it can, however, also be assigned to the liquid fuel injector unit. The flow limiting valve is located in the flow path to the injector unit and is in a position to interrupt the supply flow of fluid to the injector unit. Herein, blocking of the flow limiting valve occurs; on the one hand subject to the conveying fluid pressure, in that the valve body of the flow limiting valve is moved from the open into the closed position when the average pressure during an injection process falls below a pressure threshold value. On the other hand, during a malfunction of the injection system—for example when the valve body is not moved automatically into the closed position—the valve body can be moved into the closed position through activation of the integrated control valve. This occurs through a change in pressure in the control fluid which—in the case of the dual-fuel injection system—is a liquid fuel. At an accordingly significant change in pressure in the control fluid, the control element of the control valve is moved from the non-functional into the functional position in which the control element moves the valve body into the closed position.

The valve body of the flow limiting valve is advantageously force-actuated into its open position by a spring element. According to an additional advantageous embodiment, the control element of the control valve is force-actuated by a spring element into its non-functional position where the valve body is unaffected by the control element. Through activation of the control element—for example via the control fluid—the control element is moved from the non-functional position into the functional position, against the force exerted upon it by the spring element and can move the valve body from the open into the closed position, against the force exerted upon it by the spring element.

The control element of the control valve is again moved into the non-functional position through the force of the spring element, as soon as the pressure conditions in the control fluid readjust accordingly. This is the case during proper function of a dual fuel injection system.

According to an additional embodiment, a throttle is integrated into a control line of the control fluid where a drop in pressure in the control fluid occurs that can be used for activation the control valve. For example, the higher pressure upstream from the throttle is supplied to the control element, so that the increased pressure moves the control element into the non-functional position and holds it in same. If the pressure in the control line drops, the control element moves into its functional position due to the spring force effect and moves the valve body into the closed position.

The adjustment of the control element of the control valve occurs when a minimum pressure is exceeded. An adjustable pilot valve can be arranged in a control line that, in the case of a dual fuel injection system, is connected with the liquid fuel injector unit, whereby the control line runs into a fuel tank downstream of the pilot valve and the pressure of the control fluid is tapped for the adjustment motion of the control valve. The throttle is located expediently downstream from the pilot valve whereby the pressure immediately upstream of the throttle is tapped for activation of the control valve. The pilot valve—for example a 2/2-way valve—switches with the cycle of the injection in the liquid fuel injector unit, whereby in the case of a closed pilot valve the pressure downstream of the pilot valve is decreased and in the case of an open pilot valve it is increased. A medium pressure is thereby adjusted that is greater than the minimum pressure that is necessary to hold the control valve in the non-functional position. In contrast, the minimum pressure is no longer attained if the pilot valve remains closed in the case of a malfunction, whereupon the control valve is moved into the functional position for closing of the valve body.

According to an additional embodiment, the control element of the control valve is designed as an adjusting piston that is adjustable in a piston housing space in the flow limiting valve. At least one side of the adjusting piston or of a component that is connected with the adjusting piston is supplied with the control fluid in order to hold the adjusting piston in the non-functional position, against the force of the spring element. According to an additional embodiment, both opposite end faces of the adjusting piston or of components connected with the adjusting piston are supplied with the control fluid, however at different pressures, in particular with the pressure in the control line upstream and downstream of the throttle. This embodiment offers the advantage that the volume displacement that occurs in the piston housing space during a movement of the adjusting piston can be removed via the connection with the control line. Moreover, possible erroneous flows are immediately discharged between the two chambers of the piston housing space on opposite sides of the adjusting piston or the component that is connected with the adjusting piston, without impairing the operational function.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiments of the invention, in one form, and such exemplification is not to be construed as limiting the scope of the invention in any manner.

DETAILED DESCRIPTION OF THE INVENTION

Figure 1:
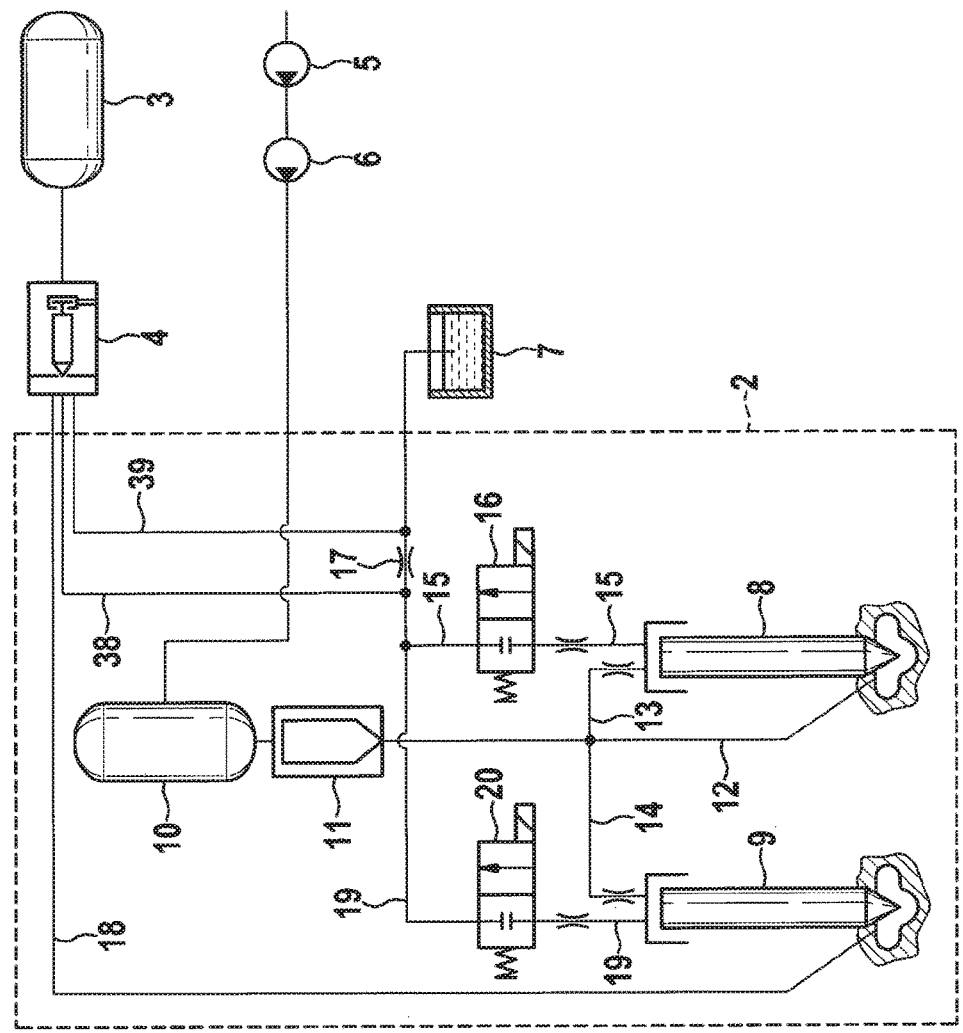
FIG. 1 is a schematic illustration of a dual fuel injection system for an internal combustion engine according to the invention.

The dual fuel injection system 1 illustrated in FIG. 1 is equipped for operation in the pilot injection method with liquid fuel, for example diesel fuel or heavy oil or bio-oil, as well as for operation with burnable gas, for example natural gas or bio-gas. Dual fuel injection system 1 includes a dual fuel injector system 2, a high-pressure gas tank 3 for storage of pressurized burnable gas, a burnable gas flow limiting valve 4 that is supplied by the high-pressure gas storage tank 3, two pumps 5 and 6 that are located in series in the fuel section, and a liquid fuel tank 7. Dual fuel injector system 2 includes a liquid fuel injector unit 8, as well as a burnable gas injector unit 9 through which the liquid fuel or burnable gas can be injected into the combustion chamber of an internal combustion engine.

High pressure tank 10 for the liquid fuel is associated with dual fuel injector system 2; said tank being supplied via in-series connected pumps 5 and 6 with the liquid fuel that is under high pressure. High pressure tank 10 is located either in the injector unit or is arranged as a common-rail high pressure tank outside the injector unit. Following high pressure tank 10, a liquid fuel flow limiting valve 11 is located in a high pressure line 12 that leads to liquid fuel injector unit 8. From this high pressure line 12, supply control lines 13 and 14 each branch to a throttle for activation of liquid fuel injector unit 8 or burnable gas injector unit 9. The fuel supplied via supply control lines 13, 14 represents the control fluid for activation of injector units 8,9.

The control fluid supplied to liquid fuel injector unit 8 flows via a return control line 15 in which a pilot valve 16 is located, to liquid fuel tank 7. Pilot valve 16 is designed for example as a 2/2-way valve. A throttle 17 is located in the control line segment between pilot valve 16 and fuel tank 7; throttles are also located in supply control lines 13 and 14 to the injector units 8, 9 and in return control line 15 upstream of pilot valve 16.

On the gas side, the burnable gas flows from high-pressure fuel tank 3 to burnable gas flow limiting valve 4 and onward via line 18 to burnable gas injector unit 9. Activation of injector unit 9 occurs via the liquid fuel that is supplied via supply control line 14. On the outlet side, the control fluid is discharged from supply control line 14 via return line 19 into which a throttle and downstream a control or pilot valve 20 is integrated. Downstream of valve 20, return control line 19 runs into return control line 15 of liquid fuel injector unit 8, upstream of throttle 17.

During the starting procedure of the internal combustion engine, the dual fuel injection system 1 operates preferably exclusively with fuel injection via liquid fuel injector unit 8. At higher speeds, changeover to gas operation in the pilot injection method can occur, whereby a pilot injection occurs via liquid injector unit 8.

Figure 2:
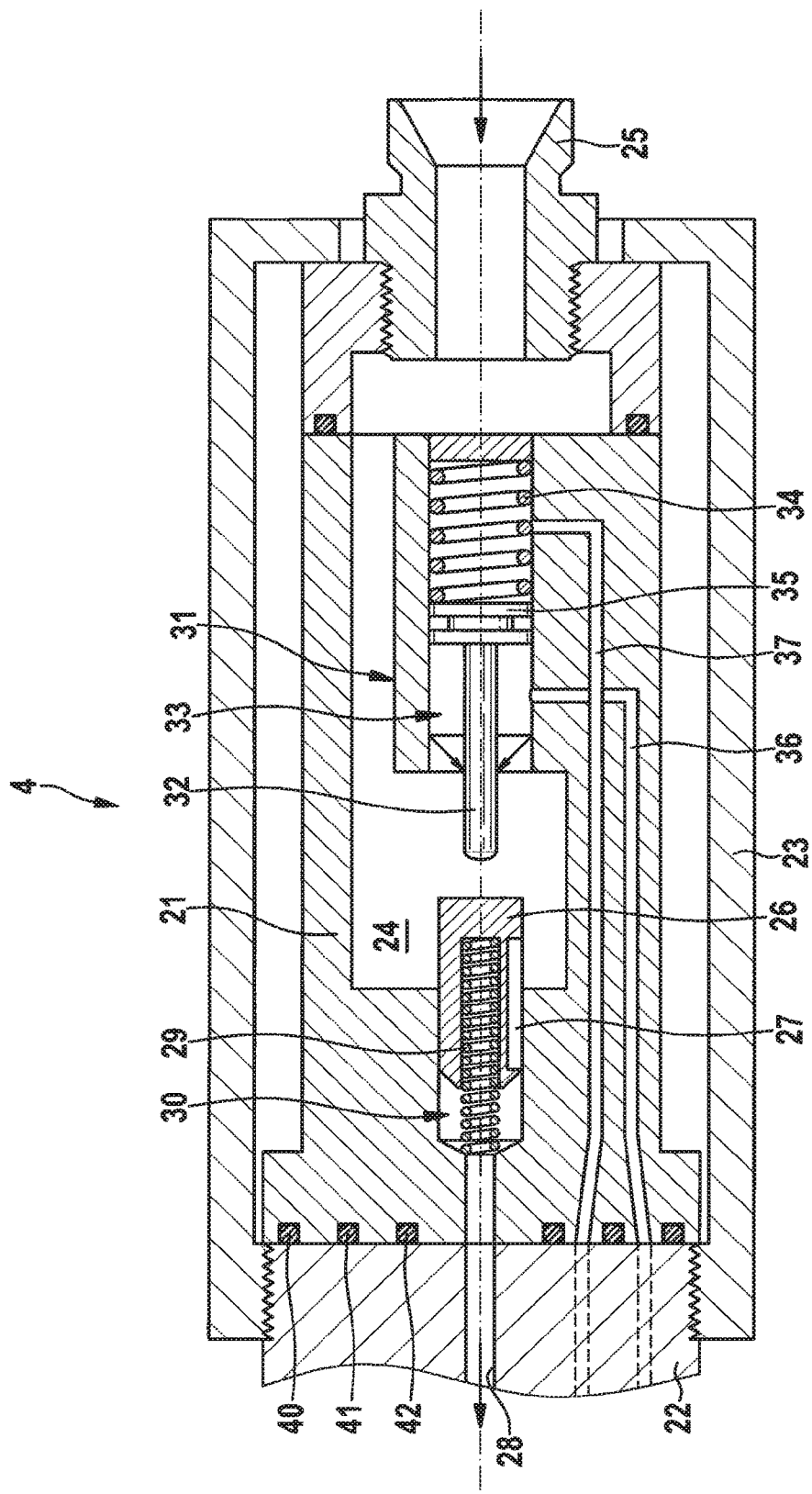
FIG. 2 is a longitudinal sectional view of a flow limiting valve according to the invention.

Now referring to FIG. 2 with continued reference to FIG. 1, a longitudinal section of burnable gas flow limiting valve 4 is illustrated. Flow limiting valve 4 includes a housing 21, as well as flange piece 22 facing the injector inlet and which is connected with housing 21 by way of a cap nut 23.

In housing 21 a gas chamber 24 is established into which gas flows from the high pressure gas tank 3, through a connecting element 25 located on the opposite side of flange piece 22 as indicated by the arrow. In gas chamber 24 a piston shaped valve body 26 can move axially, whereby into its wall an axially progressing overflow channel 27 is incorporated through which the gas travels from gas chamber 24 to an outlet channel 28 in flange piece 22, from where the gas—as indicated by the arrow—is diverted out of the burnable fuel flow limiting valve 4 and is moved along in the direction of the injector unit.

Valve body 26 is force-actuated into its open position by a spring element 29. Valve body 26 is located in a housing space 30 and can be axially moved inside housing space 30. As a result of the force of spring element 29, valve body 26 is held in its open position where valve body 26 protrudes partially into gas chamber 24 and whereby gas from gas chamber 24 gets into outlet channel 28 via overflow channel 27. In the event that valve body 26 is completely or almost completely pushed into housing space 30, overflow channel 27 will be located outside the flow connection with gas chamber 24, so that the flow connection is interrupted; the valve body is thus in a closed position wherein the flow through flow limiting valve 4 is interrupted.

The pressure of the introduced burnable gas prevailing in gas chamber 24 acts upon the face side of valve body 26 and actuates same against the force of spring element 29 into the closed position. At the same time, a gas pressure that force-actuates valve body 26 into the open position also prevails in housing space 30 where valve body 26 can move. Provided that the gas pressure is approximately equal at both end faces of valve body 26, valve body 26 is held in the open position by the force of the spring element acting upon it. However, if the gas pressure drops on the side facing away from gas chamber 24, then valve body 26 is moved into the closed position by the pressure in gas chamber 24.

A control valve 31 is integrated into housing 21 of flow limiting valve 4, whose control element 32 is in the embodiment of an adjusting piston that is arranged coaxially as well as coaxially offset relative to valve body 26. The adjusting piston is accommodated axially adjustable in an enclosed piston housing space 33 and is force actuated by a spring element 34 in a direction of a functional position, where adjusting piston 32 moves valve body 26 axially into the closed position. Adjusting piston 32 is connected with a head 35 that divides piston housing space 33 into two chambers, whereby spring element 34 engages on head 35 on the side opposite adjusting piston 32.

Piston housing space 33 is connected on both sides of head 35 via control channels 36 and 37 with control lines 38 and 39 (FIG. 1) that branch immediately upstream and downstream of throttle 17 in return control line 15 that leads to liquid fuel tank 7. Control channels 36 and 37 are provided in flange plate 22 or respectively housing 21. Sealing rings 40, 41 and 42 that seal control channels 36 and 37 radially are located between flange plate 22 and housing 21.

Via first control channel 36 that is connected with control line 38, liquid fuel is supplied as the control fluid under relatively high pressure into the chamber of piston housing space 33 with adjusting piston 32. The opposite chamber of piston housing space 33 in which spring element 34 is arranged is connected via second control channel 37 with control line 39 downstream from throttle 17 where a lower pressure prevails. This pressure differential actuates the control element with the adjusting piston and the head against the force of spring element 34 into the retracted non-functional position. If the pressure difference drops below a threshold value, the resulting force of the hydraulic differential pressure upon head 35 drops below the spring force of spring element 34, and adjusting piston 32 is moved axially from the non-functional position into the functional position in which the front face of the adjusting piston presses against valve body 26 and moves valve body 26 into its closed position.

During the fuel injection operation, pilot valve 16 opens and closes in sequence with the injection. An average pressure results hereby in return control line 15, downstream of pilot valve 16 that is conveyed via control line 38 and control channel 36 into the chamber of piston housing space 33 with adjusting piston 32. In regular operation, the average pressure exceeds the threshold value that is relevant for maintaining the non-function position, so that the control element of control valve 31 is held in the non-functional position.

If on the other hand, for example due to a malfunction, the average pressure immediately upstream of throttle 17 drops below the threshold value—which is the case for example during permanent closing of pilot valve 16—the pressure in the chamber of piston housing space 33 with the adjusting piston drops accordingly, so that spring element 34 presses the adjusting piston into the functional position and said piston closes valve body 26.

If pilot valve 20 that is allocated to burnable fuel injector unit 9 remains open due to a malfunction and at the same time, pilot valve 16 that is allocated to liquid fuel injector unit 8 is closed due to a malfunction, valve body 26 of flow limiting valve 4 is also moved into the closed position, whereas control valve 31 remains in its non-functional position.

If pilot valve 20 that is allocated to burnable fuel injector unit 9 remains open, then liquid fuel flow limiting valve 11 closes advantageously, so that flow limiting valve 4 closes subsequently.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flow control valve for a dual injection system, the flow control valve comprising:
   a housing;
   a valve body adjustable between a closed position and an open position, wherein in the open position a flow channel for a burnable gas is opened in the flow control valve and in the closed position the flow channel is closed, whereby the movement of the valve body is subject to pressure of a liquid fuel used as a control fluid or in the absence of the liquid fuel used as the control fluid; and a control valve integrated into the housing of the flow control valve through which the valve body is moveable between open and closed positions, regardless of the burnable gas.

2. A flow control valve according to claim 1, wherein the flow control valve is used in a dual-fuel injection system.

3. A flow control valve according to claim 1, wherein a control element of the control valve operates the valve body and is adjustable by a control fluid.

4. A flow control valve according to claim 3, wherein the control element is an adjusting piston and is located within a piston housing supplied with the control fluid.

5. A flow control valve according to claim 3, wherein end faces of the control element or of a component connected with the control element are supplied by the control fluid at different pressures.

6. A flow control valve according to claim 5, wherein a throttle is integrated into a control line for conveying the control fluid from a high pressure control fluid source to the control element or to components connected with the control element.

7. A flow control valve according to claim 6, wherein opposite end faces of the control element or of components connected with the control element are supplied with the control fluid upstream and downstream of the throttle.

8. A flow control valve according to claim 3, wherein the valve body and the control element of the control valve are arranged coaxially.

9. A flow control valve according to claim 3, wherein the control element of the control valve is force-actuated by a spring element into the open position.

10. A flow control valve according to claim 3, wherein the control fluid is a liquid fuel.

11. A flow control valve according to claim 1, wherein the valve body is force-actuated into the open position by a spring element.

12. A dual injection system, comprising:
a flow limiting valve, including:
a gas chamber in fluid connection with a connecting element configured to receive a burnable gas as a conveying fluid;
an outlet channel;
a control valve integrated into a housing, the control including:
a valve body adjustable between a closed position and an open position, the adjustment operable by pressure of liquid fuel used as a control fluid or in the absence of the liquid fuel used as the control fluid; and
a flow channel in the valve body for passage of the conveying fluid, the flow channel being opened between the gas chamber and the outlet channel in the open position and closed in the closed position;
a burnable gas injector unit configured to control a flow of burnable gas; and
a liquid fuel injector unit configured to control a flow of liquid fuel.

13. The dual injection system according to claim 12, wherein the flow limiting valve is allocated to the burnable gas injector unit.

14. The dual injection system according to claim 12, further comprising an adjustable pilot valve located in a control line connected with the liquid fuel injector unit, wherein the control fluid is operable to be supplied to the flow limiting valve downstream from the pilot valve.

15. A method of operating a dual-injection system, comprising:
providing a flow limiting valve, including:
a gas chamber in fluid connection with a connecting element configured to receive a conveying fluid;
an outlet channel;
a control valve integrated into a housing, the control valve including:
a valve body adjustable between a closed position and an open position, the adjustment operable by pressure of a conveying fluid or in the absence of the conveying fluid; and
a flow channel in the valve body for passage of the conveying fluid, the flow channel being opened between the gas chamber and the outlet channel in the open position and closed in the closed position;
a burnable gas injector unit configured to control a flow of burnable gas; and
a liquid fuel injector unit configured to control a flow of liquid fuel;
providing a liquid fuel used as a control fluid; and
adjusting the control valve with pressure of the control fluid.

* * * * *